Jan. 3, 1933. J. A. ARENZ 1,893,067
NUT LOCK
Filed July 2, 1931

Inventor
JOHN A. ARENZ
By His Attorney
John J. Lynch

Patented Jan. 3, 1933

1,893,067

UNITED STATES PATENT OFFICE

JOHN A. ARENZ, OF MOUNT VERNON, NEW YORK, ASSIGNOR TO LOCK NUT COMPANY, A DIVISION OF INTERNATIONAL SCREW COMPANY, OF WILMINGTON, DELAWARE, A CORPORATION OF DELAWARE

NUT LOCK

Application filed July 2, 1931. Serial No. 548,819.

This invention relates to nut locks and in particular to a simplified form adapted for use in connection with single or double thread bolts and their associated double threaded or single threaded retaining members or nuts.

A particular object of my invention is to provide in a nut having a double or single threaded interior, a locking means which can be cheaply applied to the nut and which will effectively lock the same in connection with the threaded end of a bolt so that jarring or continuous vibration will prevent an unthreading movement of the nut and its subsequent detachment from the bolt shank.

A still further object of my invention is to provide in connection with a nut and bolt, a malleable ring which, when placed in a suitable groove, in the nut, will be distorted and will jam the threads of the bolt so that resistance will be offered to their unthreading movement with respect to the thread grooves of the nut.

With these and other objects in view, the invention comprises certain constructions hereinafter described and then particularly pointed out in the claims and a preferred embodiment of my invention is illustrated in the accompanying drawing, in which:—

Figure 1:
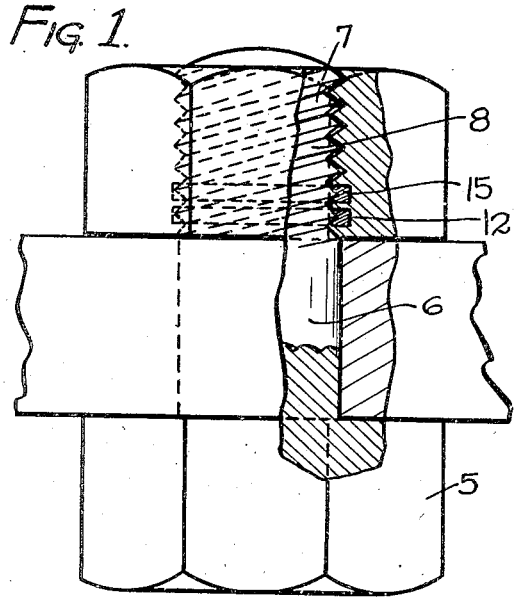
Figure 1 is a view in elevation, a part thereof being shown in section of a bolt and associated nut, the latter being in its locked position on the shank of the bolt and the locking means being shown in its functioning position.

Referring to the drawing in detail, 5 indicates a bolt having a shank 6 the end 7 of which is provided with single or double threads 8. In the forms illustrated in Figures 1 to 4, a double thread is illustrated but my invention is applicable to either and it is believed that the description of one will suffice for both.

Figure 3:
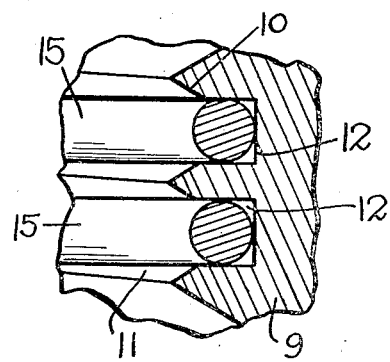
Figure 3 is an enlarged, fragmentary view in section of a portion of the nut illustrated in Figure 2 showing the seat cut in the nut to retain the locking ring.
Figure 2:
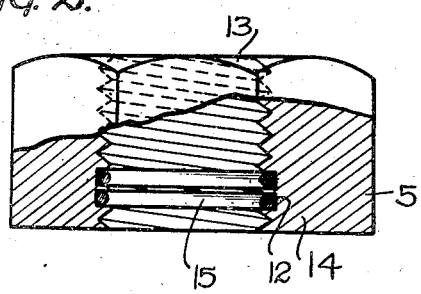
Figure 2 is a view in elevation of a nut constructed in accordance with my invention, a part thereof being shown in section to illustrate the double thread and double thread locking means.

The nut 9 which is threaded over the end of the shank 6 is also provided with corresponding single or double threads 10 and 11, see Figure 3, and in either the inner end or the outer end of the nut, I provide in the thread grooves 10 and 11, the ring grooves 12 which are not cut in alignment with the thread but are cut horizontally or parallel with the faces of the nut 9, the outer face being indicated by the numeral 13 while the inner face is indicated by the numeral 14. These grooves or groove 12 may be cut at any point adjacent the inner or outer faces of the nut 9 without regard to the position of the threads, that is, they are simply cut in the inner wall of the nut and the threads terminate or cross these grooves 12. The grooves are cut preferably after the threading of the nut is completed and without regard to the position of the threads. In the grooves which may be of the same depth as the threads or deeper depending upon the diameter of the ring metal, there is disposed a locking ring 15, a locking ring being disposed in each of the grooves in the event a double thread is used, or in the single groove where the single thread is used.

Figure 6:
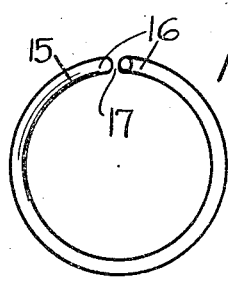

This locking ring 15 is made of soft or malleable metal and its ends 16 are spaced apart as at 17 to permit expansion when the metal is crowded into the groove when the shank of the bolt is inserted or threaded into the nut or when the nut is threaded down over the shank of the bolt. The locking ring as illustrated in Figure 6 may be slightly larger in diameter than the diameter of the groove 12 into which it is to seat so that when it is placed in the groove, it will be slightly closed and firmly held in position in the groove in tight fit so that it will not fall out.

Figure 4:
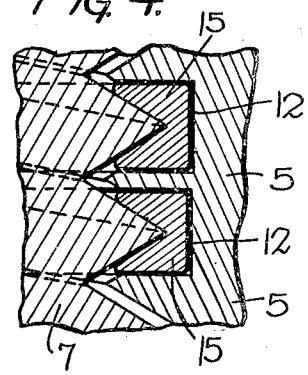
Figure 4 is a view similar to Figure 3 showing how the locking rings made of malleable material are distorted by the threads of the bolt shank which distortion jams the shank of the bolt within the nut and prevents the same from having an unthreaded movement relatively thereto.
Figure 5:
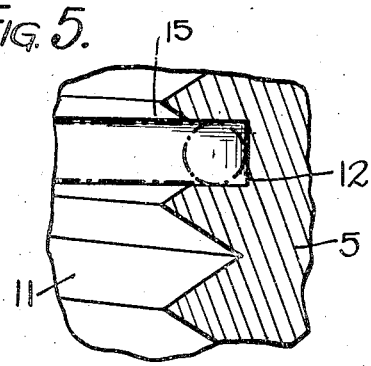
Figure 5 is a view similar to Figure 4 showing the use of a single locking ring in connection with the single thread of a nut and Figure 6 is a view in perspective of the locking ring used either singly or doubly depending upon whether or not the nut is single or double thread.

As illustrated in Figure 4, when the threaded shank 7 of the bolt is positioned within the nut 9, the threads of the bolt will cut into the locking rings 15 or ring, whichever the case may be, and will jam it into the groove 12, not only filling the groove but jamming the shank of the bolt so that any movement of the shank relatively to the nut, will be prevented. This threading of the nut down over the shank will distort the ring or rings and will effectively lock the nut on the bolt shank 6 with the result that it cannot be shaken off and can only be turned back off the shank with great pressure.

It is evident, therefore, that I have provided a nut lock which is equally adaptable to single threaded nuts and bolts and double threaded nuts and bolts and which requires a minimum of machine operation, namely, the cutting of the groove which may be done by automatic machinery and the production of the locking ring which may be made up in great numbers and which may be used doubly or singly, depending upon whether or not the lock nut and bolt to be used therewith employs a single or a double thread.

It is evident, too, that I have provided an effective locking means which is simple of construction and which may be assembled directly in the nut to form a part thereof without making necessary the assembly of the ring and the nut at the point where the assembly of the bolt is to take place.

My invention is not to be restricted to the precise details of construction shown since various changes and modifications may be made therein without departing from the scope of the invention or sacrificing the advantages derived from its use.

What I claim is:—

1. The combination with a nut having a single threaded bore, of a groove in said bore, an incomplete ring of malleable metal circular in cross section positioned in the groove, said groove being parallel with the end faces of the nut.

2. The combination with a nut having a double threaded bore, of spaced grooves in said bore parallel with each other and with the end faces of the nut, a single coil malleable metal ring of circular cross section having its ends spaced positioned in each of the grooves, said rings being arranged for distortion by the threads of a bolt shank over which said nut is positioned.

In testimony whereof I affix my signature.

JOHN A. ARENZ. [L. S.]